United States Patent
Kaneko et al.

(10) Patent No.: US 12,079,234 B2
(45) Date of Patent: Sep. 3, 2024

(54) INFORMATION PROCESSING APPARATUS, INFORMATION PROCESSING METHOD, AND INFORMATION PROCESSING PROGRAM

(71) Applicant: FUJIFILM CORPORATION, Tokyo (JP)

(72) Inventors: Yasuhisa Kaneko, Tokyo (JP); Nobuya Kitamura, Tokyo (JP); Tomohide Hiragami, Tokyo (JP); Yasuyuki Hosono, Tokyo (JP); Kenji Nagamiya, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 18/167,086

(22) Filed: Feb. 10, 2023

(65) Prior Publication Data
US 2023/0259515 A1    Aug. 17, 2023

(30) Foreign Application Priority Data
Feb. 16, 2022 (JP) .................... 2022-022499

(51) Int. Cl.
*G06F 16/248* (2019.01)
*G06F 16/242* (2019.01)
(52) U.S. Cl.
CPC ........ *G06F 16/248* (2019.01); *G06F 16/2423* (2019.01)
(58) Field of Classification Search
None
See application file for complete search history.

(56) References Cited

U.S. PATENT DOCUMENTS

| | | | | |
|---|---|---|---|---|
| 7,085,763 B2* | 8/2006 | Ochiai | .................. | G06F 16/248 707/999.005 |
| 7,143,107 B1* | 11/2006 | Nebres, Jr. | .......... | G06F 16/2423 707/999.005 |
| 7,237,015 B1* | 6/2007 | Ochiai | .................... | H04L 67/52 709/221 |
| 9,697,282 B2* | 7/2017 | Masuko | ................ | G06F 16/951 |
| 11,442,946 B2* | 9/2022 | Arora | ....................... | G06F 16/29 |
| 2003/0115199 A1* | 6/2003 | Ochiai | .................. | G06F 16/248 |
| 2006/0136459 A1* | 6/2006 | Trinon | .................. | G06F 16/248 |
| 2007/0027750 A1* | 2/2007 | Chou | ................. | G06Q 30/0257 705/14.55 |
| 2013/0226965 A1* | 8/2013 | Fukui | .................... | G06F 16/248 707/770 |

(Continued)

FOREIGN PATENT DOCUMENTS

JP        2007-172375 A     7/2007

*Primary Examiner* — Kim T Nguyen
(74) *Attorney, Agent, or Firm* — SOLARIS Intellectual Property Group, PLLC

(57) ABSTRACT

An information processing apparatus includes at least one processor, in which the processor receives a search objective target selected as a search objective from among a plurality of objective targets which are objective target subjects or objective target objects capable of being the search objective for which attribute information indicating an attribute is set, receives a search condition designated by a searcher, and outputs a search result obtained by searching for a search target based on a plurality of keywords corresponding to the attribute information set for the search objective target and the search condition.

13 Claims, 13 Drawing Sheets

(56) References Cited

U.S. PATENT DOCUMENTS

| | | | |
|---|---|---|---|
| 2015/0006570 A1* | 1/2015 | Masuko | G06F 16/38 707/769 |
| 2023/0259515 A1* | 8/2023 | Kaneko | G06F 16/9535 707/722 |
| 2023/0259516 A1* | 8/2023 | Kaneko | G06F 16/248 707/722 |

* cited by examiner

FIG. 4A

| TARGET SUBJECT NAME | ICON | ATTRIBUTE INFORMATION | | SEARCH HISTORY |
|---|---|---|---|---|
| | | ITEM | | |
| A |  | AGE | 40 YEARS OLD | "TRAVEL DESTINATION", "HOT SPRING" |
| | | GENDER | MALE | |
| | | OCCUPATION | OFFICE WORKER | |
| | | HOBBY | WATCHING BASEBALL | |
| | | PHYSICAL INFORMATION | IRREGULAR PULSE | |
| | | RELATIONSHIP INFORMATION | (SEE ANOTHER FIGURE) | |
| | | OTHERS | SINGLE-FAMILY HOUSE, LIVING WITH WIFE AND CHILD | |
| B |  | AGE | 38 YEARS OLD | |
| | | GENDER | FEMALE | |
| | | OCCUPATION | HOUSEWIFE | |
| | | HOBBY | READING BOOK | |
| | | PHYSICAL INFORMATION | - | |
| | | RELATIONSHIP INFORMATION | (SEE ANOTHER FIGURE) | |
| | | OTHERS | SINGLE-FAMILY HOUSE, LIVING WITH HUSBAND AND CHILD | |
| C |  | AGE | 12 YEARS OLD | |
| | | GENDER | MALE | |
| | | OCCUPATION | PRIMARY SCHOOL CHILD | |
| | | HOBBY | SOCCER | |
| | | PHYSICAL INFORMATION | - | |
| | | RELATIONSHIP INFORMATION | (SEE ANOTHER FIGURE) | |
| | | OTHERS | SINGLE-FAMILY HOUSE, LIVING WITH PARENTS | |
| D |  | AGE | 72 YEARS OLD | |
| | | GENDER | FEMALE | |
| | | OCCUPATION | JOBLESS | |
| | | HOBBY | FANCYWORK | |
| | | PHYSICAL INFORMATION | REQUIRING NURSING CARE 2 | |
| | | RELATIONSHIP INFORMATION | (SEE ANOTHER FIGURE) | |
| | | OTHERS | WIDOW, LIVING ALONE | |
| E |  | AGE | 2 YEARS OLD | |
| | | GENDER | MALE | |
| | | CATEGORY 1 | DOG | |
| | | CATEGORY 2 | TOY POODLE | |
| | | PHYSICAL INFORMATION | - | |
| | | RELATIONSHIP INFORMATION | (SEE ANOTHER FIGURE) | |
| | | OTHERS | - | |

FIG. 4B

| PARTNER | PERSON HIMSELF/HERSELF | | | | |
|---|---|---|---|---|---|
| | A | B | C | D | E |
| A | | HUSBAND | FARTHER | SON | OWNER |
| B | WIFE | | MOTHER | DAUGHTER-IN-LAW | OWNER |
| C | SON | SON | | GRANDCHILD | OWNER |
| D | MOTHER | MOTHER-IN-LAW | GRANDMOTHER | | – |
| E | PET | PET | PET | – | |

30B

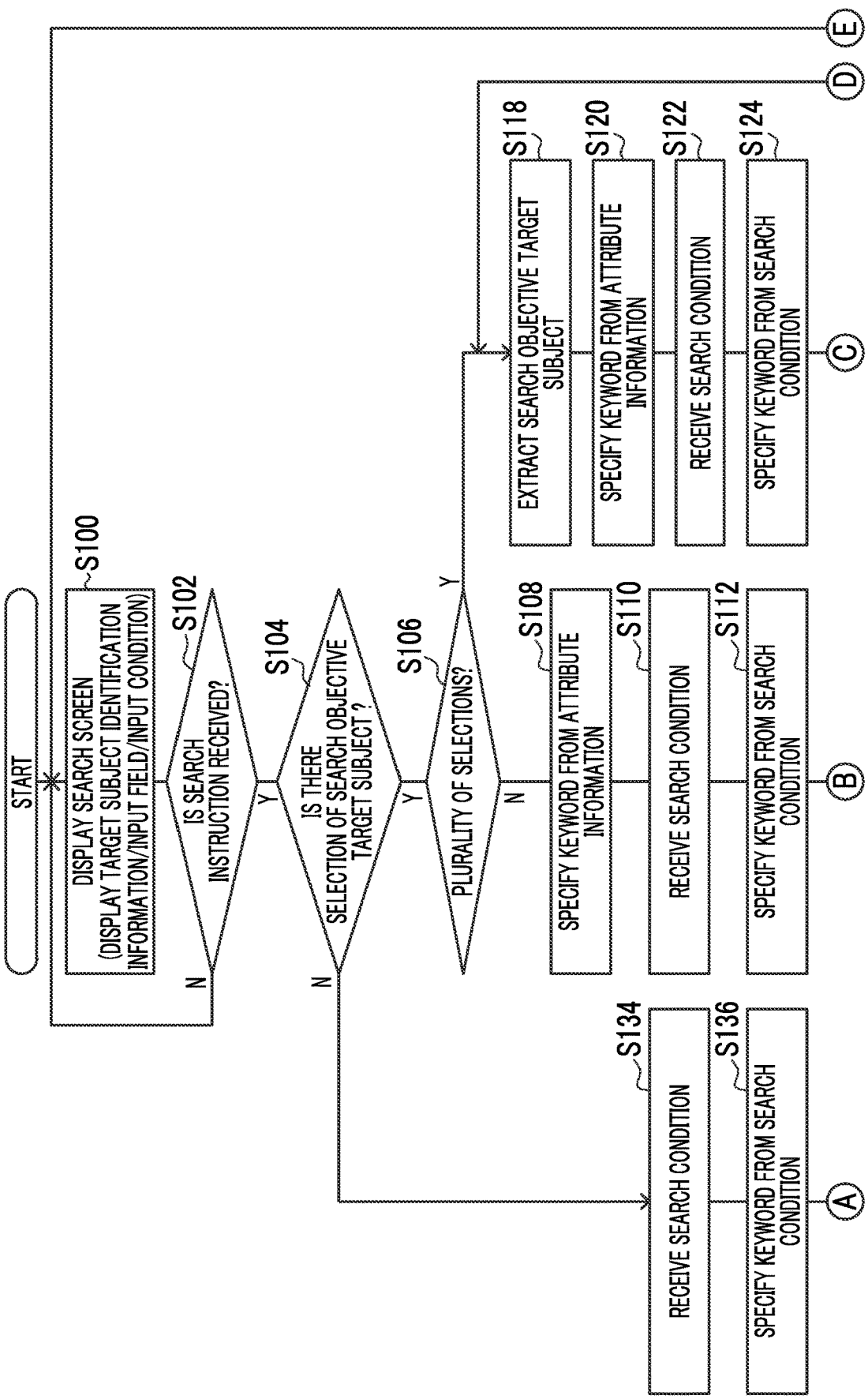

FIG. 9

| TARGET SUBJECT NAME | ICON | ATTRIBUTE INFORMATION | | SEARCH HISTORY |
|---|---|---|---|---|
| | | ITEM | | |
| A |  | AGE | 40 YEARS OLD | "TRAVEL DESTINATION HOT SPRING PLURALITY OF SELECTIONS" |
| | | GENDER | MALE | |
| | | OCCUPATION | OFFICE WORKER | |
| | | HOBBY | WATCHING BASEBALL | |
| | | PHYSICAL INFORMATION | IRREGULAR PULSE | |
| | | RELATIONSHIP INFORMATION | (SEE ANOTHER FIGURE) | |
| | | OTHERS | SINGLE-FAMILY HOUSE, LIVING WITH WIFE AND CHILD | |
| B |  | AGE | 38 YEARS OLD | "TRAVEL DESTINATION HOT SPRING PLURALITY OF SELECTIONS" |
| | | GENDER | FEMALE | |
| | | OCCUPATION | HOUSEWIFE | |
| | | HOBBY | READING BOOK | |
| | | PHYSICAL INFORMATION | - | |
| | | RELATIONSHIP INFORMATION | (SEE ANOTHER FIGURE) | |
| | | OTHERS | SINGLE-FAMILY HOUSE, LIVING WITH HUSBAND AND CHILD | |
| C |  | AGE | 12 YEARS OLD | |
| | | GENDER | MALE | |
| | | OCCUPATION | PRIMARY SCHOOL CHILD | |
| | | HOBBY | SOCCER | |
| | | PHYSICAL INFORMATION | - | |
| | | RELATIONSHIP INFORMATION | (SEE ANOTHER FIGURE) | |
| | | OTHERS | SINGLE-FAMILY HOUSE, LIVING WITH PARENTS | |
| D |  | AGE | 72 YEARS OLD | |
| | | GENDER | FEMALE | |
| | | OCCUPATION | JOBLESS | |
| | | HOBBY | FANCYWORK | |
| | | PHYSICAL INFORMATION | REQUIRING NURSING CARE 2 | |
| | | RELATIONSHIP INFORMATION | (SEE ANOTHER FIGURE) | |
| | | OTHERS | WIDOW, LIVING ALONE | |
| E |  | AGE | 2 YEARS OLD | |
| | | GENDER | MALE | |
| | | CATEGORY 1 | DOG | |
| | | CATEGORY 2 | TOY POODLE | |
| | | PHYSICAL INFORMATION | - | |
| | | RELATIONSHIP INFORMATION | (SEE ANOTHER FIGURE) | |
| | | OTHERS | - | |

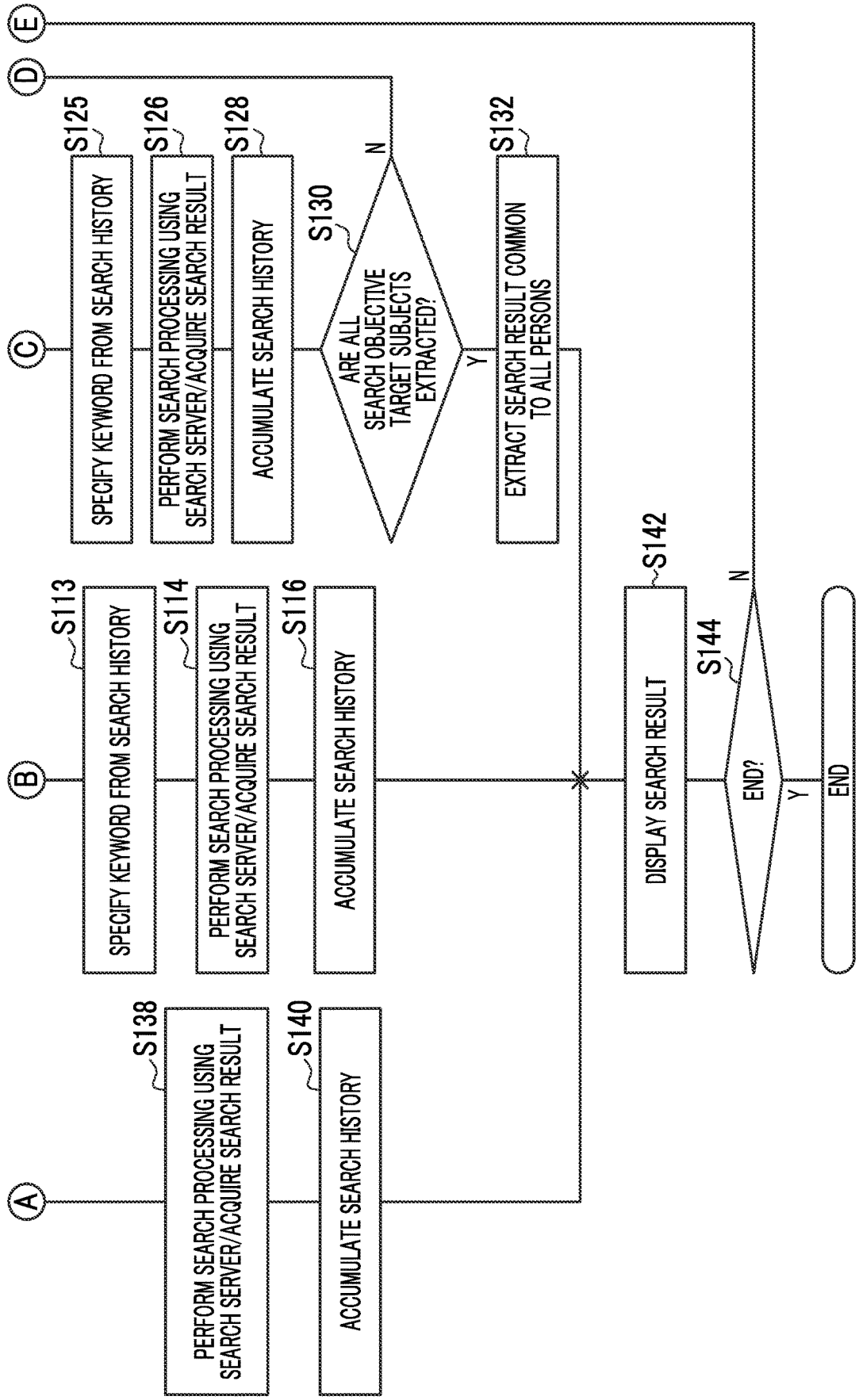

INFORMATION PROCESSING APPARATUS, INFORMATION PROCESSING METHOD, AND INFORMATION PROCESSING PROGRAM

CROSS-REFERENCE TO RELATED APPLICATIONS

This application claims priority from Japanese Application No. 2022-022499, filed on Feb. 16, 2022, the entire disclosure of which is incorporated herein by reference.

BACKGROUND

Technical Field

The present disclosure relates to an information processing apparatus, an information processing method, and an information processing program.

Related Art

In the related art, there is known the technology of searching for a search target based on a keyword corresponding to a search condition designated by a user and presenting a search result to the user. As the technology of obtaining the search result that is appropriate for the user, for example, JP2007-172375A discloses the technology of narrowing down a result obtained by searching a database that accumulates information on a search target in accordance with a classification item set by a user based on an input keyword, and outputting a search result for each classification item.

By the way, in the related art, in a case in which each of a plurality of users inputs the same keyword and performs a search, the search results for the keyword are the same. For example, in the technology disclosed in JP2007-172375A, in a case in which each of the plurality of users inputs the same keyword and sets the same classification item, the search results to be output are the same regardless of the user. However, there is a case in which the search result is appropriate for a certain user among the plurality of users and is not appropriate for another user. In such a case, in order to obtain an appropriate search result, it is necessary to add the keyword corresponding to each user to perform the search. Therefore, in the related art, there is a case in which it is necessary to input an appropriate search condition in accordance with a search objective target, such as a user, and input of the search condition is complicated.

SUMMARY

The present disclosure has been made in view of the above circumstances, and is to provide an information processing apparatus, an information processing method, and an information processing program capable of simplifying input of a search condition.

In order to achieve the object described above, the present disclosure relates to an information processing apparatus comprising at least one processor, in which the processor receives a search objective target selected as a search objective from among a plurality of objective targets which are objective target subjects or objective target objects capable of being the search objective for which attribute information indicating an attribute is set, receives a search condition designated by a searcher, and outputs a search result obtained by searching for a search target based on a plurality of keywords corresponding to the attribute information set for the search objective target and the search condition.

In addition, in order to achieve the object described above, the present disclosure relates to an information processing method executed by a processor of an information processing apparatus including at least one processor, the method comprising receiving a search objective target selected as a search objective from among a plurality of objective targets which are objective target subjects or objective target objects capable of being the search objective for which attribute information indicating an attribute is set, receiving a search condition designated by a searcher, and outputting a search result obtained by searching for a search target based on a plurality of keywords corresponding to the attribute information set for the search objective target and the search condition.

In addition, in order to achieve the object described above, the present disclosure relates to an information processing program causing a processor of an information processing apparatus including at least one processor to execute receiving a search objective target selected as a search objective from among a plurality of objective targets which are objective target subjects or objective target objects capable of being the search objective for which attribute information indicating an attribute is set, receiving a search condition designated by a searcher, and outputting a search result obtained by searching for a search target based on a plurality of keywords corresponding to the attribute information set for the search objective target and the search condition.

According to the present disclosure, the input of the search condition can be simplified.

BRIEF DESCRIPTION OF THE DRAWINGS

FIG. 4A is a diagram showing an example of an attribute information DB.

FIG. 4B is a diagram for describing relationship information included in attribute information.

FIGS. 8A and 8B are flowcharts showing an example of a flow of information processing by the information processing apparatus according to the embodiment.

FIG. 9 is a diagram for describing an example of a stored search history.

FIGS. 12A and 12B are flowcharts showing an example of a flow of information processing by an information processing apparatus according to a modification example 2.

DETAILED DESCRIPTION

In the following, an embodiment of the disclosed technology will be described in detail with reference to the drawings. It should be noted that the present embodiment does not limit the present invention.

Figure 1:
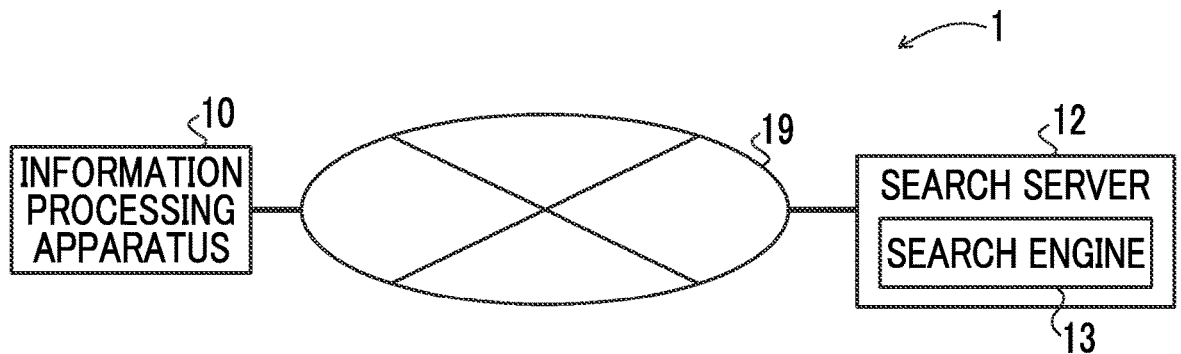
FIG. 1 is a configuration diagram schematically showing an example of an overall configuration of a search system according to an embodiment.

First, an example of an overall configuration of a search system according to the present embodiment will be described. FIG. 1 shows a configuration diagram showing an example of an overall configuration of a search system 1 according to the present embodiment. As shown in FIG. 1, the search system 1 according to the present embodiment comprises an information processing apparatus 10 and a search server 12. The information processing apparatus 10 and the search server 12 are connected to each other via a network 19 by wired communication or wireless communication. The search system 1 is a search system that performs search processing by using the search server 12 (search engine 13) provided in the network 19.

The search server 12 is a so-called server computer or a personal computer, and comprises the search engine 13. As the search engine 13, for example, an existing search engine, such as Yahoo! (registered trademark) or Google (registered trademark), can be used. The search server 12 has a function of providing a search result obtained by performing a search using the search engine 13 in response to a search request of the information processing apparatus 10 to the information processing apparatus 10 via the network 19. Specifically, the search server 12 receives a keyword as the search request from the information processing apparatus 10, and transmits information, such as a title or uniform resource locator (URL) indicating a website including the received keyword, among a plurality of websites (not shown) connected to the network 19 to the information processing apparatus 10, as the search result.

It should be noted that, in FIG. 1, the form has been described in which the search system 1 comprises one search engine 13, but the number of the search engines 13 provided in the search system 1 is not limited to one, and a plurality of search engines 13 may be provided. In this case, a plurality of search servers 12 each of which comprises the search engine 13 may be provided. In addition, the search server 12 may be restricted so that only a specific related party can access and perform a search by using a user identification (ID), a terminal ID, or the like.

On the other hand, the information processing apparatus 10 according to the present embodiment has a function of performing a search with the search server 12 via the network 19 in response to an instruction from a searcher and displaying the search result acquired from the search server 12. The information processing apparatus 10 may be, for example, a desktop computer, a laptop, a tablet computer, or a mobile terminal apparatus, such as a smartphone. It should be noted that the searcher may be a person to be determined by the information processing apparatus 10, for example, a logged-in user, and the information processing apparatus 10 may determine the searcher by using an ID or a password at the time of activation.

It should be noted that, in FIG. 1, the form has been described in which the search system 1 comprises one information processing apparatus 10, the number of the information processing apparatuses 10 provided in the search system 1 is not limited to one, and a plurality of information processing apparatuses 10 may be provided.

Figure 2:
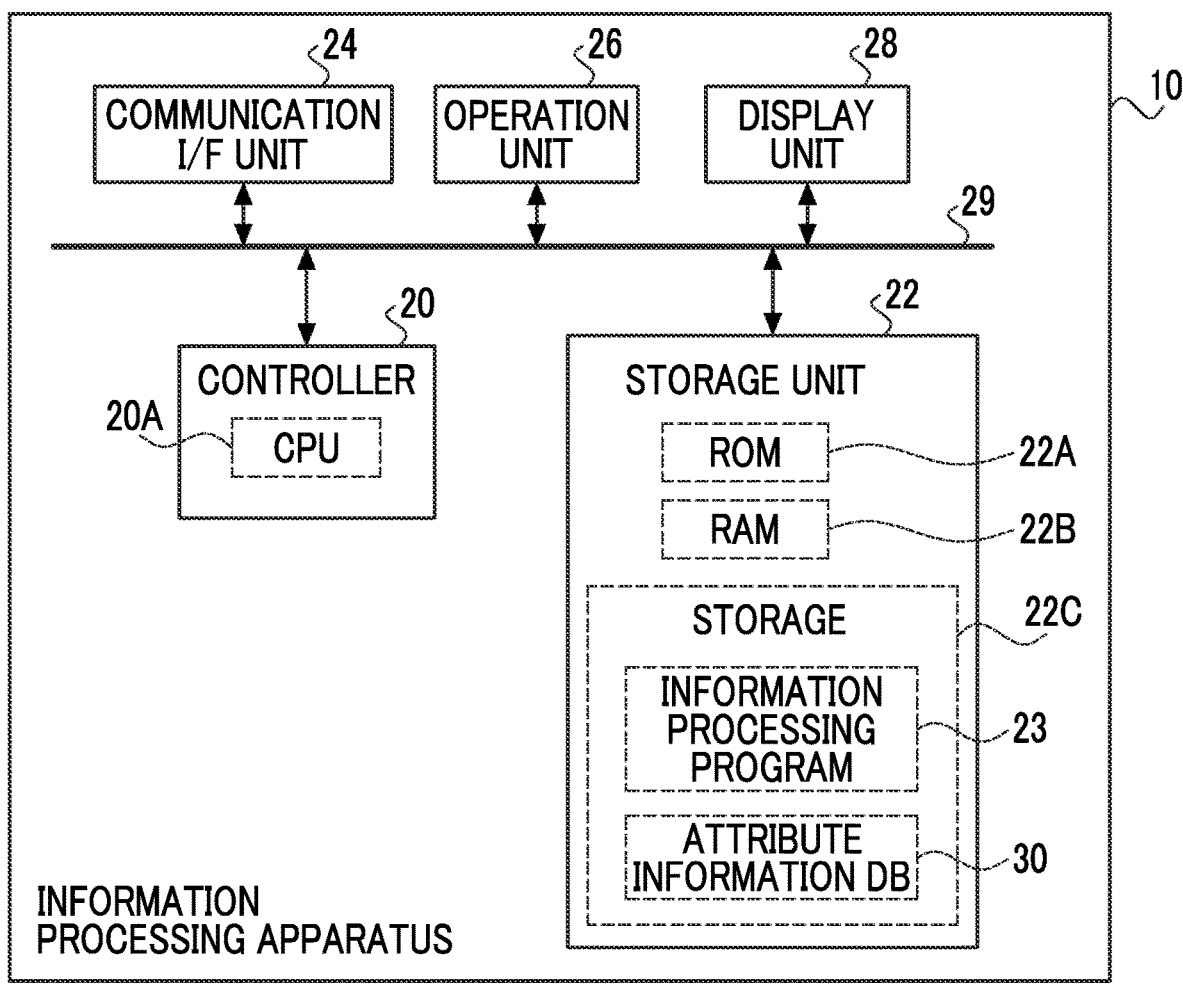
FIG. 2 is a block diagram showing an example of a configuration of an information processing apparatus according to the embodiment.

FIG. 2 is a diagram showing an example of a hardware configuration of the information processing apparatus 10. As shown in FIG. 2, the information processing apparatus 10 comprises a controller 20, a storage unit 22, a communication I/F unit 24, an operation unit 26, and a display unit 28. The controller 20, the storage unit 22, the communication I/F unit 24, the operation unit 26, and the display unit 28 are connected to each other via a bus 29, such as a system bus or a control bus, to allow exchange of various types of information.

The controller 20 according to the present embodiment controls the overall operation of the information processing apparatus 10. The controller 20 is a processor, and comprises a central processing unit (CPU) 20A. In addition, the controller 20 is connected to the storage unit 22 which will be described below.

The operation unit 26 is used for the searcher to input the instruction related to a search, various types of information, or the like. The operation unit 26 is not particularly limited, and examples thereof include various switches, a touch panel, a touch pen, and a mouse. It should be noted that the operation unit 26 may be configured as a voice input device using a microphone or the like. The display unit 28 displays the search result, various types of information, or the like. It should be noted that the operation unit 26 and the display unit 28 may be integrated to form a touch panel display.

The communication I/F unit 24 communicates various types of information including the search request, the search result, or the like using the search server 12 and the like via the network 19 by wireless communication or wired communication.

The storage unit 22 stores programs or various data used for the operation of the information processing apparatus 10. The storage unit 22 comprises, for example, a read only memory (ROM) 22A, a random access memory (RAM) 22B, and a storage 22C. Various programs and the like executed by the CPU 20A are stored in advance in the ROM 22A. The RAM 22B transitorily stores various data. The storage 22C stores an information processing program 23 executed by the CPU 20A, an attribute database (DB) 30, which will be described in detail below, or various types of other information. The information processing program 23 is a so-called search browser. The storage 22C is a non-volatile storage unit, and examples thereof include a hard disk drive (HDD) or a solid state drive (SSD).

Figure 3:
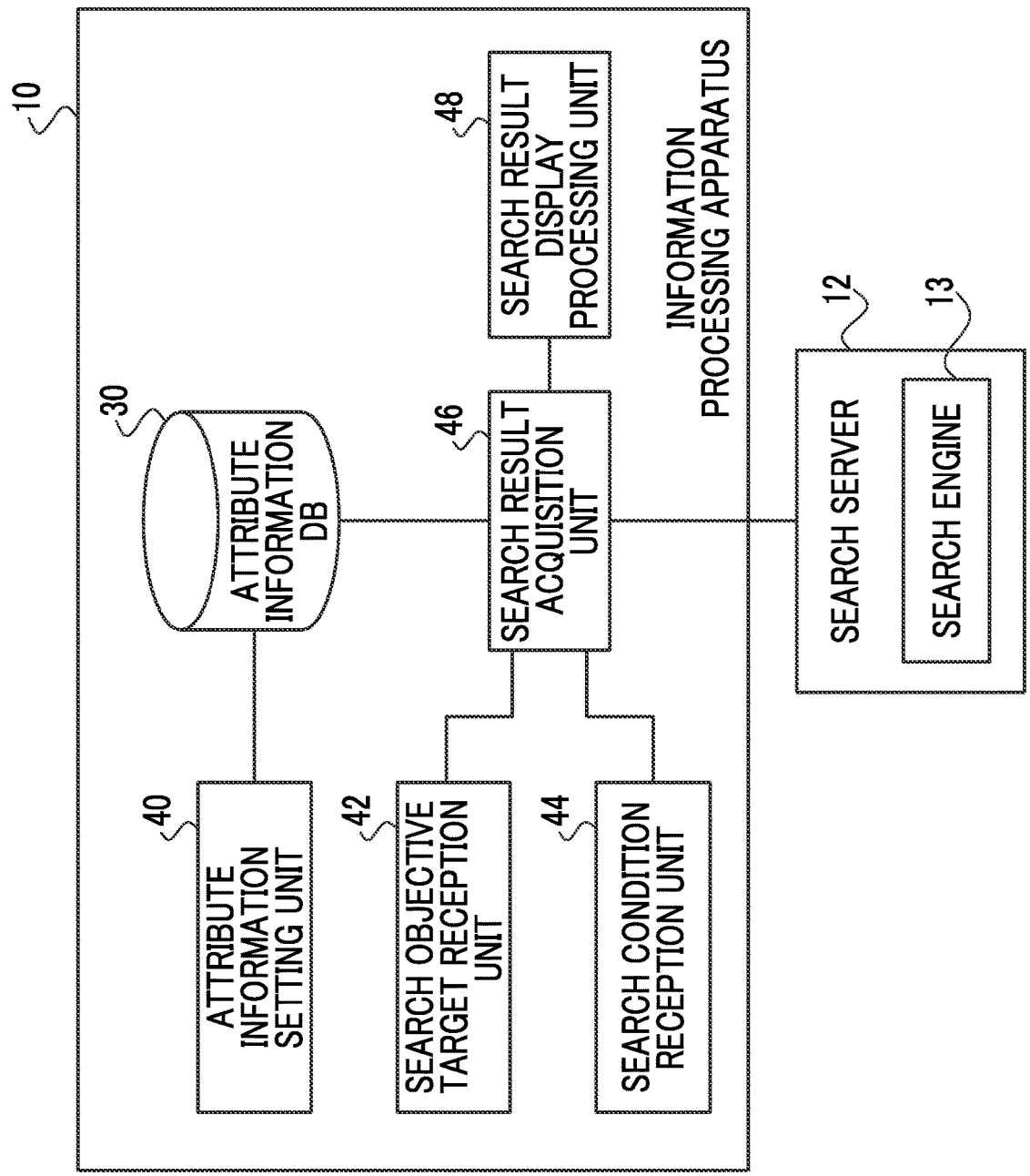
FIG. 3 is a functional block diagram showing an example of a function of the information processing apparatus according to the embodiment.

Further, FIG. 3 shows a functional block diagram of an example of the configuration of the information processing apparatus 10 according to the present embodiment. As shown in FIG. 3, the information processing apparatus 10 comprises an attribute information setting unit 40, a search objective target reception unit 42, a search condition reception unit 44, a search result acquisition unit 46, and a search result display processing unit 48. As an example, in the information processing apparatus 10 according to the present embodiment, the CPU 20A of the controller 20 executes the information processing program 23 stored in the storage 22C, so that the CPU 20A functions as the attribute information setting unit 40, the search objective target reception unit 42, the search condition reception unit 44, the search result acquisition unit 46, and the search result display processing unit 48.

The attribute information setting unit 40 has a function of setting the attribute information indicating the attribute of the target subject which is the search objective. In the information processing apparatus 10 according to the present embodiment, it is possible to obtain the search result corresponding to a specific person. In other words, it is possible to assume the specific person and obtain the search result of the search performed for the assumed specific person. For example, in a case in which the search for a leisure destination is performed, a desired search result differs depending on whether the specific person is an indoor person or an outdoor person. In such a case, in the information processing apparatus 10 according to the present embodiment, in such a case, in a case in which the specific person is the indoor person, the leisure destination for the indoor person is obtained as the search result by setting the attribute of the indoor person. On the other hand, in a case in which the specific person is the outdoor person, the leisure destination for the outdoor person is obtained as the search result by setting the attribute of the outdoor person. It should be noted that, in the present embodiment, since the target subject can be the search objective for the specific person assumed in the search in this way, the specific person is referred to as a "target subject". It should be noted that the "target subject" according to the present embodiment is an example of an "objective target subject" according to the present disclosure. In addition, in the present embodiment, the "searcher" is a person who operates the information processing apparatus 10 to perform the search at present, and the "searcher" and the "target subject" may or may not be the same. For example, in a couple, in a case in which, as the "searcher", a husband searches for a gift for a wife, the wife is the "target subject", and thus the "searcher" and the "target subject" are different from each other.

It should be noted that the target which can be the search objective is not limited to a human, and may be various organisms. That is, the information processing apparatus 10 can obtain the search result obtained by assuming a specific organism and performing the search based on the keyword corresponding to the search condition designated for the assumed specific organism. Examples of such a specific organism include various pets, such as a dog, a cat, a rabbit, and a turtle. In addition, the target which can be the search objective is not limited to the organism, and may be, for example, various groups or various articles. The information processing apparatus 10 can obtain the search result obtained by assuming a specific group or a specific article and performing the search based on the keyword corresponding to the search condition designated for the assumed specific group or specific article. Examples of such a specific group include various enterprises. In addition, examples of the specific article include various products. In addition, the term "group" as used herein includes a non-profit organization (NPO, local government, townspeople association, club, or the like) or a small organization within an enterprise (business division, department, and factory), in addition to a commercial enterprise. In addition, the product may be a facility (amusement park, zoo, or the like) or area (scenic spot, hot spring, or the like) in addition to the specific article, or the organism may be a virtual object (character, avatar, or the like). In the present embodiment, for the sake of simplification of description, the specific person, the specific organism, the specific group, or the product are collectively referred to as the "target subject". In addition, in the current search, the target subject which is the search objective is referred to as a "search objective target subject". The search objective target subject according to the present embodiment is an example of a search objective target according to the present disclosure.

The attribute information set by the attribute information setting unit 40 is stored in the storage 22C as an attribute information DB 30. FIG. 4A shows an example of the attribute information DB 30 (30A). As shown in FIG. 4A, in the attribute information DB 30, the attribute information is associated with the name indicating each target subject and the icon indicating the target subject displayed on the search screen (details will be described below), for each target subject. As an example, in the attribute information included in the attribute information DB 30A shown in FIG. 4A, the information indicating the attribute of the target subject is set for each of a plurality of items.

In the example shown in FIG. 4A, in a case in which the target subject is a human, as items of the attribute, seven of "age", "gender", "occupation", "hobby", "physical information", "relationship information", and "others" are adopted. Among the items, "age" is an age of the target subject, "gender" is a gender of the target subject, and "occupation" is an occupation of the target subject. In addition, among the items, "hobby" is a hobby of the target subject, and "physical information" is information on a body of the target subject, for example, information on health. In addition, among the items, the "relationship information" is information indicating a relationship, such as a connection among a plurality of target subjects set in the attribute information DB 30. FIG. 4B shows an example of relationship information 30B. The relationship information 30B is information indicating the connection of another target subject as seen from the target subject himself/herself. In the example shown in FIG. 4B, in a case in which the target subject A is the person himself/herself, the target subject B is a "wife", the target subject C is a "son", the target subject D is a "mother", and the target subject E is a "pet". In addition, among the items, "others" is information on the attribute of the target subject, which is not classified into each of the items described above. Examples of the attribute information that is regarded as "others" include a living environment (living environment), such as a single-family house or an apartment complex, living alone or having a co-resident, but the present disclosure is not particularly limited.

On the other hand, in the example shown in FIG. 4A, in a case in which the target subject is an animal, such as a pet, as the items of the attribute, seven of "age", "gender", "category 1", "category 2", "physical information", and "relationship information", and "others" are adopted. Among these items, "age", "gender", "category 1", "category 2", "physical information", "relationship information", and "others" are the same as in the case in which the target subject is the human. On the other hand, among the items, "category 1" is information indicating a type of an animal, such as a dog, a cat, or a rabbit, and "category 2" is information indicating a specific breed.

In addition, in the present embodiment, although the description has been made with a group assuming a family, the present invention is not limited to this. For example, in a case in which a plurality of medical diagnostic apparatuses are operated to perform examination/test in an enterprise activity, specifically, an examination/test operation in an examination/test of a hospital, it can be used for the objective of searching for the handling of each medical diagnostic apparatus. In this case, each medical diagnostic apparatus can be registered as the target subject to perform the search. As another example of the same, a production apparatus in a factory can also be used.

It should be noted that the item of the attribute information shown in FIG. 4A is an example, the number and types of the items are not particularly limited, and it is not necessary to set the item in the attribute information.

Figure 5:
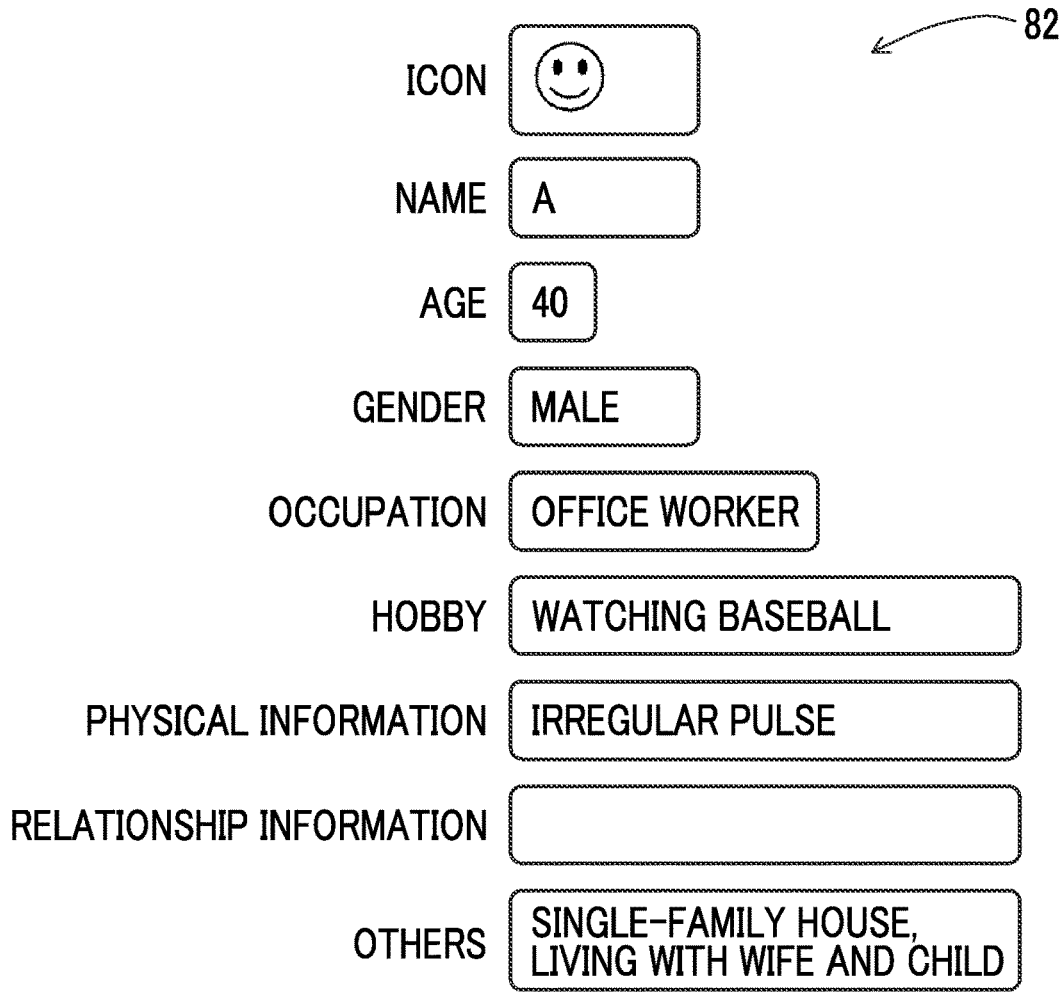
FIG. 5 is a diagram showing an example of a setting screen displayed on a display unit of the information processing apparatus according to the embodiment.

The attribute information setting unit 40 has a function of setting such attribute information in the attribute information DB 30 for each target subject. It should be noted that a method by which the attribute information setting unit 40 sets the attribute information for each target subject by is not particularly limited. As an example, the attribute information setting unit 40 according to the present embodiment displays the setting screen 82 shown in FIG. 5 as an example on the display unit 28, and sets the attribute information input by the user performing the setting in accordance with the setting screen 82 using the operation unit 26 in the attribute information DB 30. It should be noted that a method of inputting the attribute information on the setting screen 82 is not particularly limited. For example, a form may be adopted in which the user who performs the setting may freely input the attribute information, or a form may be adopted in which, in a case in which each item is clicked, the types of the attributes that can be set are displayed as a pull-down menu, and the type of the attribute corresponding to the target subject is selected from among the types of the attributes.

The search objective target reception unit 42 has a function of receiving a target subject selected as a search objective. Specifically, the search objective target reception unit 42 has a function of displaying target subject identification information 50 indicating the target subject described above in a search screen 80 shown in FIG. 6 as an example, and receiving the search objective target subject which is the current search objective selected by the searcher from among target subjects displays in the target subject identification information 50. The target subject identification information 50 according to the present embodiment is an example of marks indicating the plurality of search objective targets according to the present disclosure.

Figure 6:
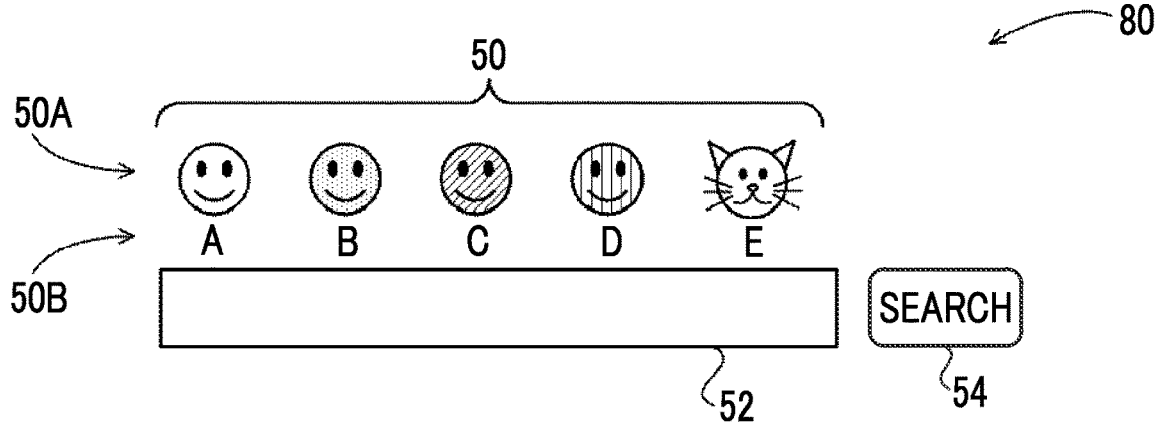
FIG. 6 is a diagram showing an example of the search screen displayed on the display unit of the information processing apparatus according to the embodiment.

FIG. 6 shows an example of the search screen 80 displayed on the display unit 28. As shown in FIG. 6, the search screen 80 includes the target subject identification information 50 for identifying the target subject which can be the search objective, the input field 52, and the search button 54. The target subject identification information 50 includes an icon 50A indicating the target subject and a name 50B indicating a name of the target subject.

Figure 7A:
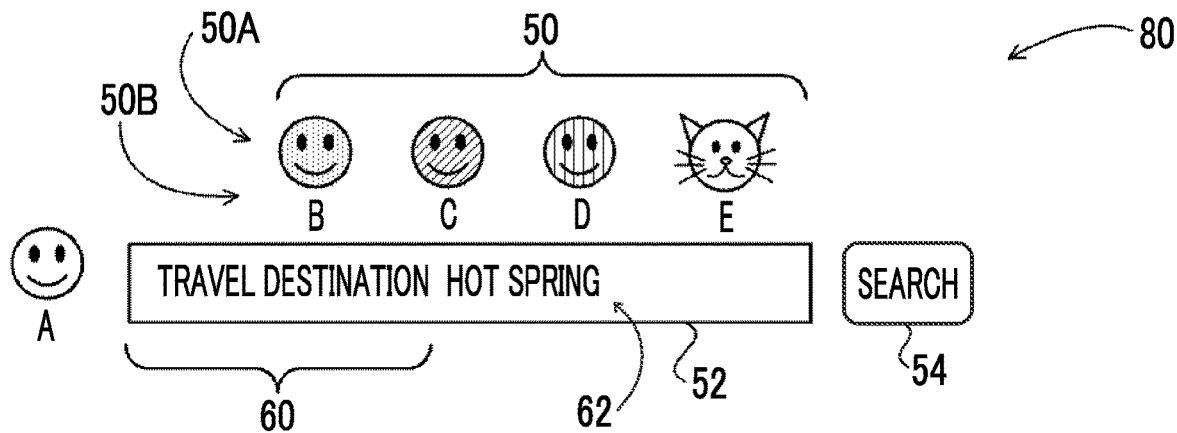
FIG. 7A is a diagram for describing an example of a search screen in a case in which a searcher selects one search objective target subject in the embodiment.
Figure 7B:
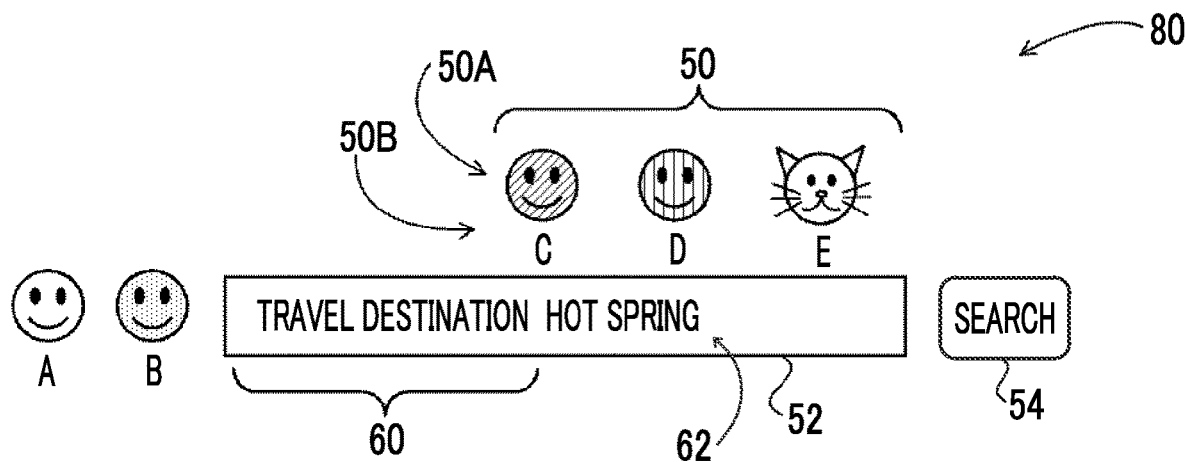
FIG. 7B is a diagram for describing an example of a search screen in a case in which the searcher selects a plurality of search objective target subjects in the embodiment.

The searcher selects the search objective target subject by, on the search screen 80, dragging and dropping the icon 50A corresponding to the search objective target subject in the current search from the target subject identification information 50 to the side of the input field 52 or clicking the icon 50A by the operation unit 26. FIG. 7A shows an example of the search screen 80 in a case in which the searcher selects one search objective target subject. Specifically, FIG. 7A shows a state in which the "target subject A" is selected by the searcher as the search objective target subject. In addition, FIG. 7B shows an example of the search screen 80 in a case in which the searcher selects the plurality (two in FIG. 7B) of search objective target subjects. Specifically, FIG. 7B shows a state in which the "target subject A" and the "target subject B" are selected by the searcher as the search objective target subject. As described above, in the information processing apparatus 10 according to the present embodiment, a plurality of search objective target subjects can be set.

In this way, the search objective target reception unit 42 receives the target subject corresponding to the icon 50A to which the searcher drags and drops as the search objective target subject. The search objective target reception unit 42 outputs the received information indicating the search objective target subject to the search result acquisition unit 46.

The search condition reception unit 44 has a function of receiving the search condition designated by the searcher. Specifically, the search condition reception unit 44 has a function of receiving a keyword 62 input by the searcher to the input field 52 by operating the operation unit 26 on the search screen 80 shown in FIG. 6 as an example, as a search condition 60. As shown in FIGS. 7A and 7B, the search condition reception unit 44 according to the present embodiment displays one input field 52 on the search screen 80 regardless of the number of target subjects and the number of search objective target subjects. In the examples shown in FIGS. 7A and 7B, as the keyword 62, a state is shown in which the searcher inputs two keywords 62 of "travel destination" and "hot spring". It should be noted that the keyword 62 to be input to the input field 52 is not particularly limited and may be, for example, any of a word or a sentence, and the number of the keywords 62 that can be input to the input field 52 is not particularly limited. The search condition reception unit 44 outputs information indicating the received search condition 60 to the search result acquisition unit 46.

The search result acquisition unit 46 acquires the search result obtained by the search using the search engine 13 based on a plurality of keywords corresponding to the attribute information set for the search objective target subject received by the search objective target reception unit 42 and the search condition 60 received by the search condition reception unit 44. Specifically, the search result acquisition unit 46 acquires the attribute information set for the search objective target subject received by the search objective target reception unit 42 from the attribute information DB 30, and specifies the acquired attribute information as the keyword. In addition, the search result acquisition unit 46 specifies the keyword 62 included in the search condition 60 received by the search condition reception unit 44 as the keyword. Further, the search result acquisition unit 46 transmits the keyword specified from the attribute information and the keyword specified from the search condition 60 to the search server 12 as the search request. In the search server 12, the search is performed using the search engine 13 based on a plurality of keywords included in the search request received from the information processing apparatus 10, and the search result is transmitted to the information processing apparatus 10. As described above, the search result is, for example, the information, such as the title or the URL indicating the website including the keyword included in the received search request.

The search result acquisition unit 46 receives the search result transmitted by the search server 12, specifies the search result to be finally provided to the user based on the received search result, and outputs the search result to the search result display processing unit 48.

The search result display processing unit 48 has a function of displaying the search result on the display unit 28. It should be noted that a method by which the search result display processing unit 48 displays the search result on the display unit 28 is not particularly limited.

Figure 8B:
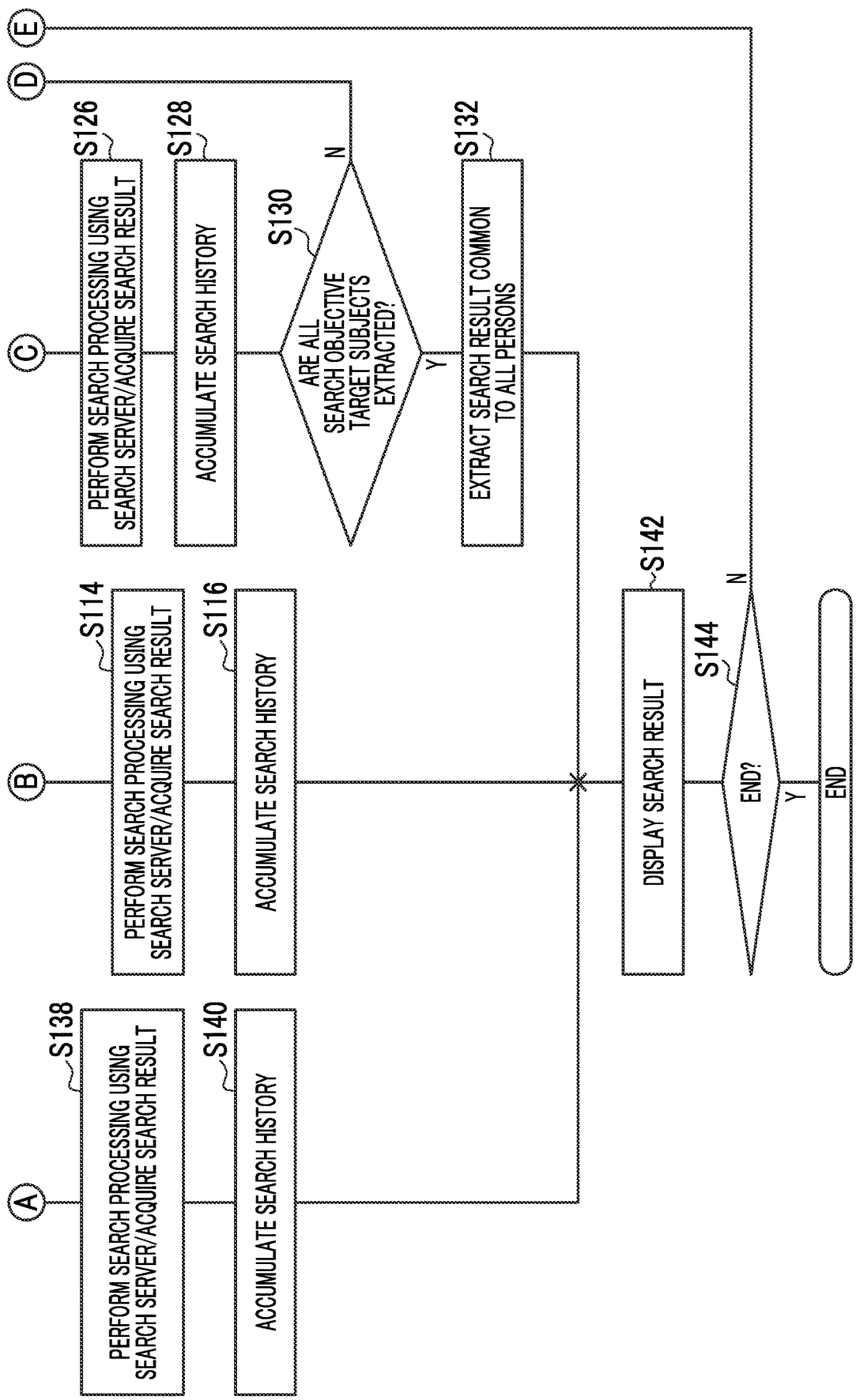

Next, an action of the information processing apparatus 10 according to the present embodiment will be described with reference to the drawings. FIGS. 8A and 8B show flowcharts showing an example of a flow of information processing executed by the information processing apparatus 10 according to the present embodiment. The information processing apparatus 10 according to the present embodiment executes the information processing shown in FIGS. 8A and 8B by the CPU 20A of the controller 20 executing the information processing program 23 stored in the storage 22C based on the instruction or the like of the searcher performed by the operation unit 26, as an example. It should be noted that, before executing the information processing shown in FIGS. 8A and 8B, as described above, the attribute information setting unit 40 sets the attribute information related to the attribute of the target subject in the attribute information DB 30 stored in the storage 22C.

In step S100 of FIG. 8A, the search screen 80 is displayed. The search objective target reception unit 42 displays the target subject identification information 50 on the search screen 80. In addition, the search condition reception unit 44 displays the input field 52 on the search screen 80.

As described above, the searcher operates the operation unit 26 to select the search objective target subject from the target subject identification information 50 on the search screen 80. In addition, the searcher operates the operation unit 26 to input the keyword 62 that is the search condition 60 to the input field 52. After the selection of the search objective target subject and the input of the search condition 60 end, the searcher operates the search button 54 to instruct the execution of the search.

In next step S102, it is determined whether or not a search instruction is received. Until the search instruction is received, in other words, until the searcher operates the search button 54 to instruct the execution of the search, a negative determination is made in the determination in step S102, and the processing returns to step S100. On the other hand, in a case in which the search instruction is received, a positive determination is made in the determination in step S102, and the processing proceeds to step S104.

In step S104, it is determined whether or not there is the selection of the search objective target subject. In the present embodiment, it is possible to perform the search without selecting the search objective target subject. So to speak, in the search system 1 according to the present embodiment, a general-purpose search can be performed without assuming the search objective target subject. In this case, the searcher inputs the keyword 62 that is the search condition 60 to the input field 52 without selecting the search objective target subject. On the other hand, as shown in FIGS. 7A and 7B, in a case in which the search objective target subject is selected, the search objective target reception unit 42 receives the selection of the search objective target subject, a positive determination is made in the determination in step S104, and the processing proceeds to step S106. For example, in the form shown in FIG. 7A, the search objective target reception unit 42 receives the "target subject A" as the search objective target subject. In addition, in the form shown in FIG. 7B, the search objective target reception unit 42 receives the "target subject A" and the "target subject B" as the search objective target subject.

In step S106, the search result acquisition unit 46 determines whether or not a plurality of search objective target subjects are selected. In a case in which there is only one search objective target subject selected as in the form shown in FIG. 7A, a negative determination is made in the determination in step S106, and the processing proceeds to step S108.

In step S108, as described above, the search result acquisition unit 46 specifies the keyword to be used for the search from the attribute information indicating the attribute of the selected search objective target subject with reference to the attribute information DB 30.

In next step S110, the search condition reception unit 44 receives the search condition 60 input to the input field 52 of the search screen 80, as described above. In next step S112, the search result acquisition unit 46 specifies the keyword 62 to be used for the search from the received search condition 60, as described above. In the form shown in FIG. 7A, the two keywords 62 of "travel destination" and "hot spring" are specified from the search condition 60.

In next step S114, as described above, the search result acquisition unit 46 performs the search processing using the search engine 13 of the search server 12 and acquires the search result from the search server 12. Specifically, the search result acquisition unit 46 transmits the search request including the keyword specified in step S108 and the keyword 62 specified in step S112 to the search server 12 via the network 19, and transmits the search result by the search engine 13 to the search server 12 via the network 19.

In next step S116, the search result acquisition unit 46 stores the keyword to be used for the search as the search history, and the processing proceeds to step S142. As an example, as shown in FIG. 4A, the search result acquisition unit 46 accumulates the search history in the attribute information DB 30 in association with the search objective target subject.

On the other hand, in a case in which the plurality of search objective target subjects are selected, a positive determination is made in the determination in step S106, and the processing proceeds to step S118. In step S118, the search result acquisition unit 46 extracts one search objective target subject from among the plurality of selected search objective target subjects.

In next step S120, as described above, the search result acquisition unit 46 specifies the keyword to be used for the search from the attribute information indicating the attribute of the search objective target subject extracted in step S118 with reference to the attribute information DB 30.

In next step S122, the search condition reception unit 44 receives the search condition 60 input to the input field 52 of the search screen 80, as described above. In next step S124, the search result acquisition unit 46 specifies the keyword 62 to be used for the search from the received search condition 60, as described above. In the form shown in FIG. 7B, the two keywords 62 of "travel destination" and "hot spring" are specified from the search condition 60.

In next step S126, as described above, the search result acquisition unit 46 performs the search processing using the search engine 13 of the search server 12 and acquires the search result from the search server 12. Specifically, the search result acquisition unit 46 transmits the search request including the keyword specified in step S120 and the keyword 62 specified in step S124 to the search server 12 via the network 19, and transmits the search result by the search engine 13 to the search server 12 via the network 19.

In next step S128, the search result acquisition unit 46 accumulates the keyword to be used for the search as the search history. As an example, as shown in FIG. 9, the search result acquisition unit 46 stores the search history in the attribute information DB 30 in association with the search objective target subject. It should be noted that, in the present embodiment, in a case in which the plurality of search objective target subjects are selected, information indicating that effect is also included in the search history. For example, in the example of the attribute information DB 30A shown in FIG. 9, the search histories of the target subject A and the target subject B include the information indicating that "a plurality of selections" are made.

In next step S130, it is determined whether or not all of the plurality of selected search objective target subjects are extracted in step S118. In a case in which there is a search objective target subject that has not been extracted yet, a negative determination is made in the determination in step S130, the processing returns to step S118, the search objective target subject that has not yet been extracted is extracted, and the processing of steps S120 to S128 is repeated. On the other hand, in a case in which all the search objective target subjects are extracted, a positive determination is made in the determination in step S130, and the processing proceeds to step S132.

In step S132, the search result acquisition unit 46 extracts the search result common to all the search objective target subjects as the final search result from all the search results acquired for each search objective target subject, and then the processing proceeds to step S142. As described above, in the present embodiment, in a case in which the plurality of search objective target subjects are selected, a product of a set of the search results of each search objective target subject is extracted as the final search result. It should be noted that, in the present embodiment, in a case in which there are the plurality of search objective target subjects, the keyword specified from the attribute information of each search objective target subject and the keyword specified from the search condition are searched for, and then the common search result is extracted as the final search result, but the present disclosure is not limited to this. For example, in a case in which there are the plurality of search objective target subjects, the search result obtained by performing the search using the keyword specified from the attribute information common to the plurality of selected search objective target subjects and the keyword specified from the search condition may be extracted as the final search result.

In addition, as described above, in the information processing apparatus 10, it is possible to perform the search without selecting the search objective target subject. In this case, the searcher inputs the search condition 60 to the input field 52 of the search screen 80, but does not select the search objective target subject. In a case in which the search objective target subject is not selected, a negative determination is made in the determination in step S104, and the processing proceeds to step S134.

In step S134, the search condition reception unit 44 receives the search condition 60 input to the input field 52 of the search screen 80, as described above. In next step S136, the search result acquisition unit 46 specifies the keyword 62 to be used for the search from the received search condition 60, as described above.

In next step S138, the search result acquisition unit 46 transmits the keyword specified in step S136 to the search server 12 as the search request to perform the search processing using the search engine 13 of the search server 12, and acquires the search result from the search server 12.

In next step S140, the search result acquisition unit 46 accumulates the keyword used in the search as the search history, and then the processing proceeds to step S142. In this case, the search result acquisition unit 46 accumulates the search history in the storage 22C separately from the attribute information DB 30.

In step S142, the search result display processing unit 48 displays the search result on the display unit 28. Specifically, the search result acquired in step S114, the detection result extracted in step S132, or the search result acquired in step S138 are displayed on the display unit 28.

In next step S144, it is determined whether or not the information processing shown in FIGS. 8A and 8B ends. As an example, in the present embodiment, until a predetermined end condition is satisfied, a negative determination is made in the determination in step S144, the processing returns to step S100, and the processing of steps S100 to S140 is repeated.

On the other hand, in a case in which the predetermined end condition, such as reception of an instruction to end the search by the searcher, is satisfied, a positive determination is made in the determination in step S144, and the information processing shown in FIGS. 8A and 8B ends.

The present embodiment described above is an example of the technology of the present disclosure, and various modification examples can be made. For example, the following modification examples and the like may be made.

Modification Example 1

In the form described above, the form has been described in which, in a case in which there are the plurality of selected search objective target subjects, the same search condition 60 is input for the plurality of search objective target subjects. On the other hand, in the information processing apparatus 10 according to the present modification example, the search condition 60 can be input for each of the plurality of search objective target subjects.

Figure 10:
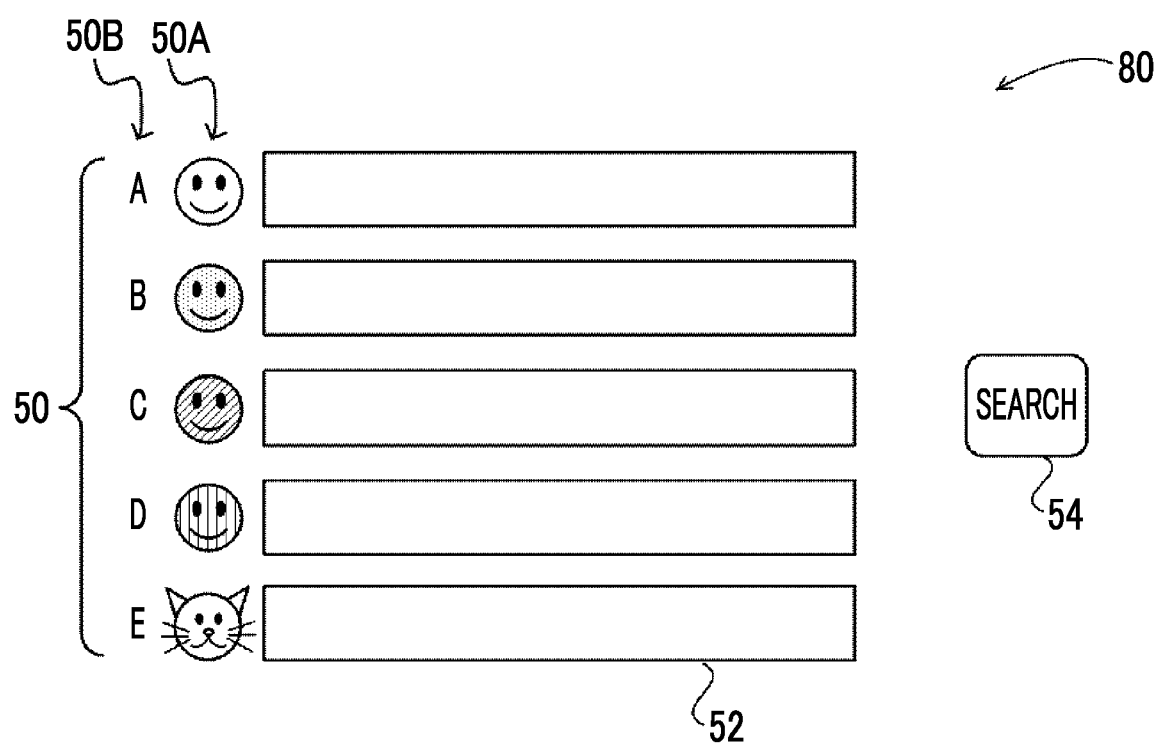
FIG. 10 is a diagram showing an example of a search screen displayed on a display unit of an information processing apparatus according to a modification example 1.

FIG. 10 shows an example of the search screen 80 displayed on the display unit 28 by the information processing apparatus 10 according to the present modification example. As shown in FIG. 10, the input field 52 is displayed for each target subject on the search screen 80 according to the present modification example.

In the example shown in FIG. 10, the searcher selects the search objective target subject by clicking the icon 50A or the name 50B corresponding to the target subject as the search objective target subject by using the operation unit 26. The search objective target reception unit 42 receives the target subject for which the icon 50A or the name 50B is clicked as the search objective target subject.

In addition, as shown in FIG. 10, the search condition reception unit 44 displays the input field 52 for each target subject. The searcher inputs the search condition 60 to the input field 52 provided in accordance with the target subject selected as the search objective target subject. The search condition reception unit 44 receives the search condition 60 input to the input field 52. It should be noted that, in the present modification example, as in the embodiment, the operation unit 26 is used to receive the selection of the icon 50A or the name 50B corresponding to the target subject as the search objective target, but the present disclosure is not limited to this. For example, the target subject corresponding to the input field to which the keyword 62 is input as the search condition 60 may be selected as the search objective target subject.

Figure 11A:
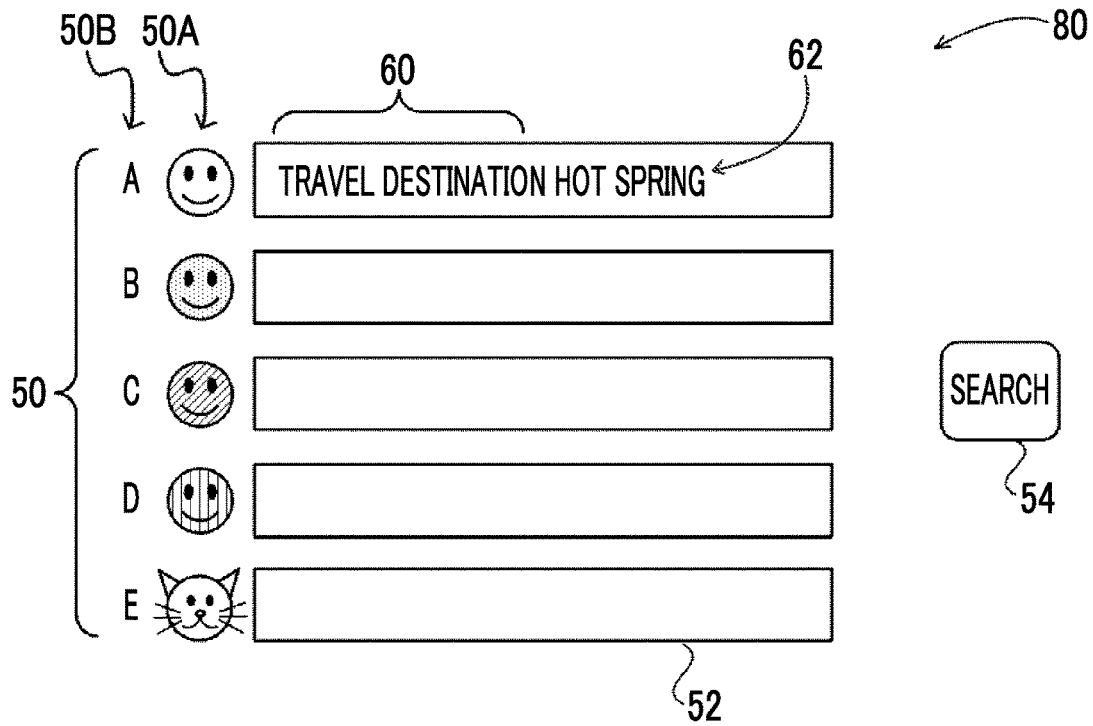
FIG. 11A is a diagram for describing an example of a search screen in a case in which a searcher selects one search objective target subject in the modification example 1.

FIG. 11A shows an example of the search screen 80 in a case in which the searcher selects one search objective target subject. In the example shown in FIG. 11A, a state is shown in which the target subject A is selected as the search objective target subject by the searcher and the two keywords 62 of "travel destination" and "hot spring" are input as the search condition 60.

Figure 11B:
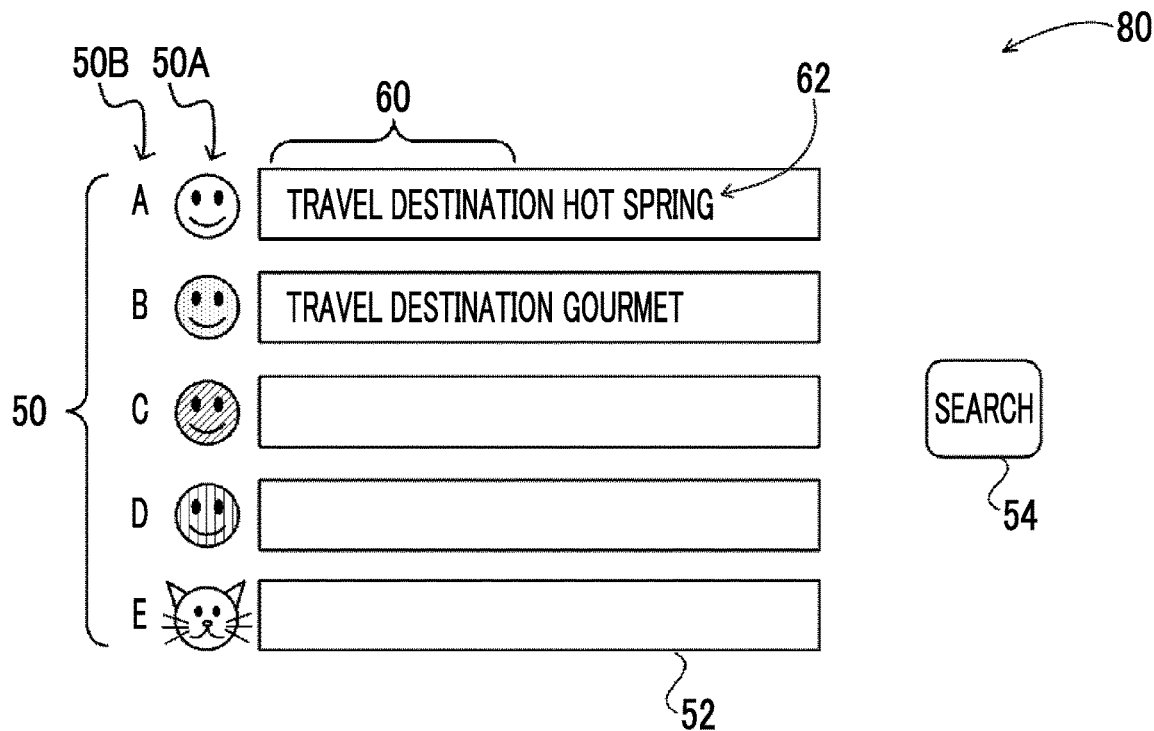
FIG. 11B is a diagram for describing an example of a search screen in a case in which the searcher selects a plurality of search objective target subjects in the modification example 1.

In addition, FIG. 11B shows an example of the search screen 80 in a case in which the searcher selects the plurality of search objective target subjects. In the example shown in FIG. 11B, a state is shown in which the target subject A and the target subject B are selected as the search objective target subjects by the searcher, the two keywords 62 of "travel destination" and "hot spring" are input for the target subject A as the search condition 60, and the two keywords 62 of "travel destination" and "gourmet" are input for the target subject B.

Next, an action of the information processing apparatus 10 according to the present modification example will be described with reference to the drawings. A flow of information processing executed in the information processing apparatus 10 according to the present modification example is the same as the information processing described above with reference to FIGS. 8A and 8B. However, in a case in which there are the plurality of selected search objective target subjects, since the search condition 60 is input for each search objective target subject, the search result finally displayed as the search result is different between the embodiment described above and the present modification example.

In the example shown in FIG. 11B, in a case in which the target subject A is extracted as the search objective target subject in step S118 of the information processing, in step S120, the search result acquisition unit 46 specifies the keyword from the attribute information of the target subject A with reference to the attribute information DB 30. In next step S122, the search condition reception unit 44 receives the search condition 60 input to the input field 52 provided for the target subject A. In next step S124, the search result acquisition unit 46 specifies the two keywords 62 of "travel destination" and "hot spring" from the search condition 60 received in step S122. In next step S126, the search result acquisition unit 46 transmits the search request including the keyword specified from the attribute information of the target subject A and the keyword 62 specified from the search condition 60 to the search server 12 via the network 19, and transmits the search result by the search engine 13 to the search server 12 via the network 19. In next step S128, the search result acquisition unit 46 accumulates the keyword to be used for the search as the search history.

In addition, in the example shown in FIG. 11B, in a case in which the target subject B is extracted as the search objective target subject in step S118 of the information processing, in step S120, the search result acquisition unit 46 specifies the keyword from the attribute information of the target subject B with reference to the attribute information DB 30. In next step S122, the search condition reception unit 44 receives the search condition 60 input to the input field 52 provided for the target subject B. In next step S124, the search result acquisition unit 46 specifies the two keywords 62 of "travel destination" and "gourmet" from the search condition 60 received in step S122. In next step S126, the search result acquisition unit 46 transmits the search request including the keyword specified from the attribute information of the target subject B and the keyword 62 specified from the search condition 60 to the search server 12 via the network 19, and transmits the search result by the search engine 13 to the search server 12 via the network 19. In next step S128, the search result acquisition unit 46 accumulates the keyword to be used for the search as the search history.

In addition, after the acquisition of the search result with the target subject A as the search objective target subject and the acquisition of the search result with the target subject B as the search objective target subject end, in step S132, the search result acquisition unit 46 extracts the search result common to the search result in which the target subject A is the search objective target subject and the search result in which the target subject B is the search objective target subject as the final search result, and then the processing proceeds to step S142. As described above, in the present modification example as well, in a case in which the plurality of search objective target subjects are selected, a product of a set of the search results of each search objective target subject is extracted as the final search result.

As described above, in the present modification example, since the search condition 60 can be received for each search objective target subject, the search can be performed corresponding to each search objective target subject, and the search accuracy can be improved.

Modification Example 2

Figure 12A:
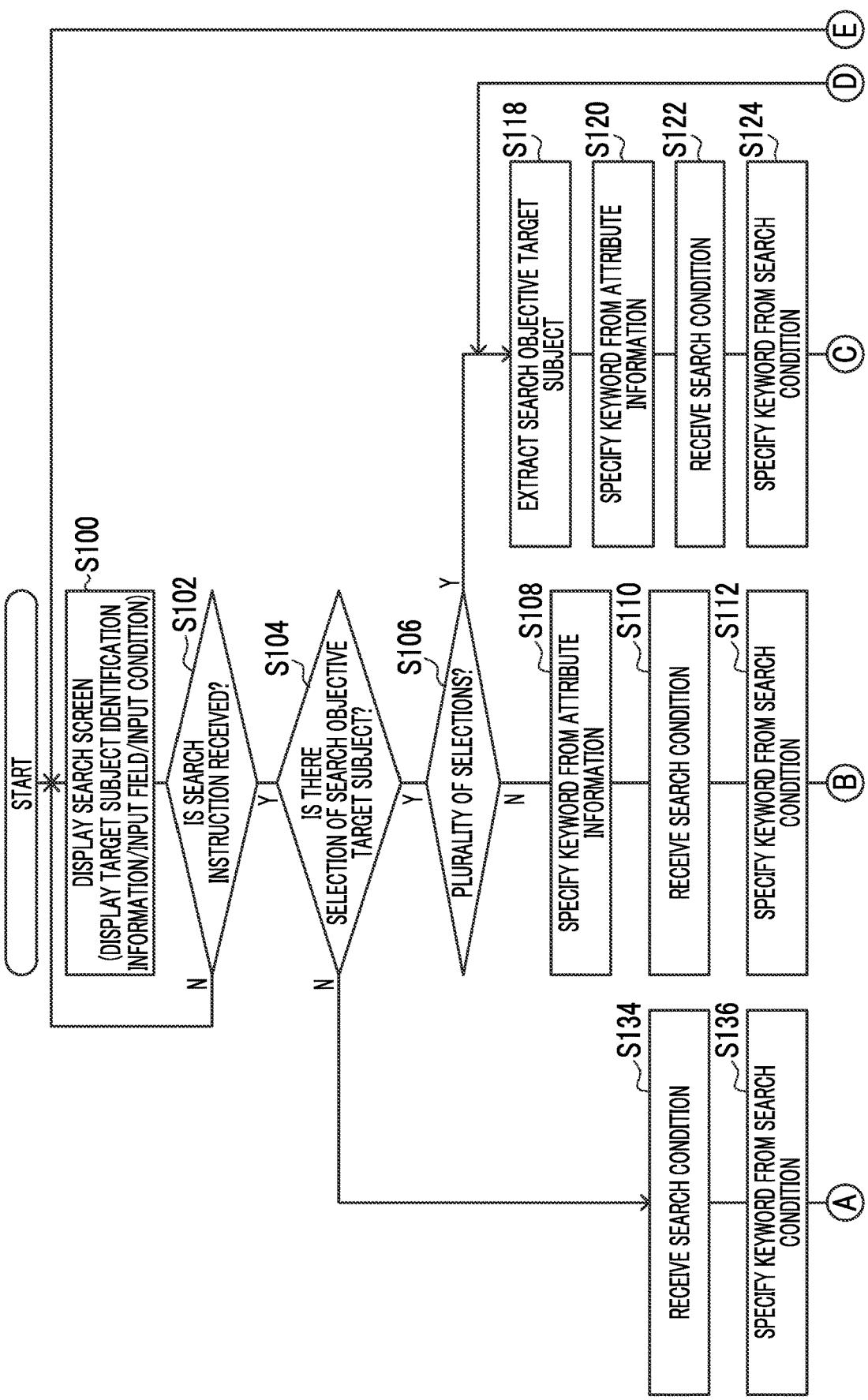

In the present modification example, a form will be described in which the search is performed by further using the keyword corresponding to the accumulated search history. FIGS. 12A and 12B show flowcharts showing an example of a flow of information processing by the information processing apparatus 10 according to the present modification example. As shown in FIGS. 12A and 12B, the information processing according to the present modification example is different from the information processing (see FIGS. 8A and 8B) described above in that the processing of step S113 is included between step S112 and step S114 and the processing of step S125 is provided between step S124 and step S126.

In step S113, the search result acquisition unit 46 specifies the keyword from the search history accumulated in association with the selected search objective target subject with reference to the attribute information DB 30. By the processing of the present step, in step S114, the search result acquisition unit 46 transmits the search request including the keyword specified in step S108, the keyword 62 specified in step S112, and the keyword specified in step S114 to the search server 12 via the network 19, and transmits the search result by the search engine 13 to the search server 12 via the network 19.

In addition, in step S125, the search result acquisition unit 46 specifies the keyword from the search history accumulated in association with the search objective target subject extracted in step S118 with reference to the attribute information DB 30. By the processing of the present step, in step S126, the search result acquisition unit 46 transmits the search request including the keyword specified in step S120, the keyword 62 specified in step S124, and the keyword specified in step S125 to the search server 12 via the network 19, and transmits the search result by the search engine 13 to the search server 12 via the network 19.

It should be noted that a method by which the search result acquisition unit 46 specifies the keyword to be used for the current search from the accumulated search history is not particularly limited. The accumulated search history may be specified as the keyword as it is. In addition, for example, the search history related to the search condition 60 in the current search may be specified as the keyword from among a plurality of search histories. In this case, for example, the search condition 60 or the keyword 62 may be analyzed, a category (genre) may be classified, and the search history classified into the same category (genre) may be specified as the keyword.

As described above, in the present modification example, since the keyword corresponding to the search history accumulated for each target subject is used for the search, it is possible to obtain the search result more suitable for the search objective target subject.

As described above, in the information processing apparatus 10 according to each form described above, the search objective target reception unit 42 receives the target subject which is the target that can be the search objective and is selected as the search objective from among a plurality of targets for which the attribute information indicating the attribute is set. The search condition reception unit 44 receives the search condition 60 designated by the searcher. The search result acquisition unit 46 acquires the search result obtained by the search using the search engine 13 of the search server 12 based on the plurality of keywords 62 corresponding to the attribute information set for the target subject and the search condition 60, and outputs the search result to the search result display processing unit 48.

As described above, in the information processing apparatus 10 according to each form described above, the search is performed based on the plurality of keywords 62 corresponding to the attribute information indicating the attribute of the search objective target subject and the search condition 60. Therefore, the searcher can perform an appropriate search corresponding to each search objective target subject without inputting detailed search condition corresponding to each search objective target subject. Therefore, with the information processing apparatus 10 according to each form described above, it is possible to simplify the input of the search condition 60. In addition, with the information processing apparatus 10 according to each form described above, it is possible to improve the search accuracy while simplifying the input of the search condition 60.

It should be noted that, in the modification example 2 described above, as an example of the search method using the accumulated search history, the form has been described in which the keyword specified from the search history itself is used for the search, but other forms may be used. For example, a form may be adopted in which the attribute information setting unit 40 analyzes the search history (search condition 60) and adds the setting by using the analysis result as the attribute information. For example, in a case in which the search history (search condition 60) is "match result Yomiuri Giants", a form may be adopted in which the attribute information setting unit 40 analyzes the "match result Yomiuri Giants" and adds the attribute of "Yomiuri Giants fan" to the attribute information DB 30.

It should be noted that, in the form described above, the form has been described in which the information processing apparatus 10 and the search server 12 are separate bodies, but the present disclosure is not limited to the present form, and a form may be adopted in which the information processing apparatus 10 and the search server 12 may be integrated into one apparatus. In other words, the information processing apparatus 10 may include the search engine 13. Alternatively, in the present embodiment, the information processing apparatus 10 receives the input of the searcher or performs display to the searcher, but the present disclosure is not limited to this. For example, a terminal apparatus operated by the searcher may receive the input of the search objective target or the search condition of the searcher, and the information processing apparatus 10 may receive the input information received by the terminal apparatus, via the network or the like. In addition, the information processing apparatus 10 does not include the display unit 28, the search result acquired by the search result acquisition unit 46 may be transmitted to the terminal apparatus including the display unit 28 via the network or the like, and the terminal apparatus that receives the search result may perform display to the searcher.

In addition, in the form described above, for example, as the hardware structures of the processing units that execute various types of processing, such as the attribute information setting unit 40, the search objective target reception unit 42, the search condition reception unit 44, the search result acquisition unit 46, and the search result display processing unit 48, the following various processors can be used. As described above, in addition to a CPU which is a general-purpose processor which executes software (program) and functions as various processing units, the various processors include a programmable logic device (PLD) which is a processor of which a circuit configuration can be changed after manufacture, such as a field programmable gate array (FPGA), and a dedicated electric circuit which is a processor having a circuit configuration which is designed for exclusive use in order to execute specific processing, such as an application specific integrated circuit (ASIC).

One processing unit may be configured by one of the various processors or may be configured by a combination of two or more processors of the same type or different types (for example, a combination of a plurality of FPGAs or a combination of a CPU and an FPGA). In addition, a plurality of the processing units may be configured by one processor.

As a first example of the configuration in which a plurality of processing units are configured by one processor, as represented by a computer, such as a client and a server, there is a form in which one processor is configured by a combination of one or more CPUs and software and the processor functions as the plurality of processing units. As a second example, as represented by a system on chip (SoC) or the like, there is a form in which a processor that realizes the function of the entire system including the plurality of processing units by one integrated circuit (IC) chip is used. As described above, various processing units are configured by one or more of the various processors as the hardware structures.

Further, more specifically, an electric circuit (circuitry) obtained by combining circuit elements, such as semiconductor elements, can be used as the hardware structures of the various processors.

In addition, in the embodiment described above, an aspect has been described in which the information processing program 23 is stored (installed) in the storage 22C of the storage unit 22 in advance, but the present disclosure is not limited to this. The information processing program 23 may be provided in a form of being recorded in a recording medium, such as a compact disc read only memory (CD-ROM), a digital versatile disc read only memory (DVD-ROM), and a universal serial bus (USB) memory. In addition, each information processing program 23 may be provided in a form being downloaded from an external device via a network. That is, the program described in the present embodiment (program product) may be provided in a form of the recording medium or in a form of being distributed from an external computer.

What is claimed is:

1. An information processing apparatus comprising:
at least one processor, wherein the processor:
receives a search objective target selected from among a plurality of search objective targets, each of the plurality of search objective targets including attribute information indicating an attribute which is set in advance;
receives a search condition designated by a searcher; and outputs a search result obtained by searching for a search target based on a plurality of keywords corresponding to the attribute information set for the selected search objective target and the search condition.

2. The information processing apparatus according to claim 1, wherein the processor:
displays an input field for the searcher to input the search condition on a display unit; and
receives the search condition input to the input field.

3. The information processing apparatus according to claim 2, wherein the processor displays one input field provided for the plurality of objective targets on the display unit.

4. The information processing apparatus according to claim 3, wherein, in a case in which a plurality of the search objective targets are received, the processor:
acquires the search result obtained by searching for the search target based on the plurality of keywords corresponding to the attribute information and the search condition, for each search objective target; and
displays a search result common to the search result of each search objective target as a final search result.

5. The information processing apparatus according to claim 2, wherein the processor displays a plurality of the input fields provided for the plurality of objective targets, respectively, on the display unit.

6. The information processing apparatus according to claim 5, wherein, in a case in which a plurality of the search objective targets are received, the processor:
acquires a search result obtained by searching for the search target based on the plurality of keywords corresponding to the attribute information and the search condition input to a corresponding input field, for each search objective target; and
displays a search result common to the search result of each search objective target as a final search result.

7. The information processing apparatus according to claim 1, wherein the plurality of keywords include a keyword specified from the attribute information and a keyword specified from the search condition.

8. The information processing apparatus according to claim 1, wherein the processor accumulates the plurality of keywords used for a search performed as the search objective target, as a search history, for each of the plurality of objective targets.

9. The information processing apparatus according to claim 8, wherein the processor outputs a search result obtained by searching for the search target based on the plurality of keywords corresponding to the attribute information set for the search objective target, the search condition, and the search history accumulated in correspondence to the search objective target.

10. The information processing apparatus according to claim 1, wherein:
the objective target subject is a specific person, and
the objective target object is at least one of a specific organism, a specific group, or a specific article.

11. The information processing apparatus according to claim 1, wherein the processor:
displays marks indicating a plurality of the search objective targets; and
receives a search objective target selected by the searcher designating the mark.

12. An information processing method executed by a processor of an information processing apparatus including at least one processor, the method comprising:
receiving a search objective target selected from among a plurality of search objective targets, each of the plurality of search objective targets including attribute information indicating an attribute which is set in advance;
receiving a search condition designated by a searcher; and
outputting a search result obtained by searching for a search target based on a plurality of keywords corresponding to the attribute information set for the selected search objective target and the search condition.

13. A non-transitory computer readable medium storing an information processing program causing a processor of an information processing apparatus including at least one processor to execute:
receiving a search objective target selected from among a plurality of search objective targets, each of the plurality of search objective targets including attribute information indicating an attribute which is set in advance;
receiving a search condition designated by a searcher; and
outputting a search result obtained by searching for a search target based on a plurality of keywords corresponding to the attribute information set for the selected search objective target and the search condition.

* * * * *